(12) United States Patent
Nishikawa et al.

(10) Patent No.: US 7,400,567 B2
(45) Date of Patent: Jul. 15, 2008

(54) OPTICAL INFORMATION RECORDING-REPRODUCTION APPARATUS

(75) Inventors: Koichiro Nishikawa, Takasaki (JP); Takashi Fukuhara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 11/561,066

(22) Filed: Nov. 17, 2006

(65) Prior Publication Data
US 2007/0121437 A1    May 31, 2007

(30) Foreign Application Priority Data
Nov. 29, 2005    (JP)    ............................. 2005-343881
Nov. 29, 2005    (JP)    ............................. 2005-343886

(51) Int. Cl.
*G11B 7/0065*    (2006.01)
(52) U.S. Cl. .................................................. 369/103
(58) Field of Classification Search .................. None
See application file for complete search history.

(56) References Cited

U.S. PATENT DOCUMENTS

| | | | |
|---|---|---|---|
| 5,159,588 A * | 10/1992 | Nakano et al. | 369/44.22 |
| 5,189,653 A * | 2/1993 | Yanagi | 369/44.32 |
| 5,247,503 A * | 9/1993 | Nomiyama et al. | 369/44.35 |
| 5,521,897 A | 5/1996 | Nishikawa | 369/11.6 |
| 5,671,199 A | 9/1997 | Nishikawa | 369/44.26 |
| 6,310,726 B1 * | 10/2001 | Iizuka | 359/618 |
| 6,665,242 B2 | 12/2003 | Nishikawa | 369/47.5 |
| 2003/0021493 A1* | 1/2003 | Nakaya et al. | 382/305 |
| 2003/0231573 A1 | 12/2003 | Matsumoto et al. | 369/112.29 |
| 2005/0030876 A1 | 2/2005 | Horimai | 369/103 |
| 2005/0254400 A1 | 11/2005 | Nishikawa | 369/112.23 |
| 2006/0067179 A1* | 3/2006 | Matsumoto et al. | 369/47.1 |
| 2006/0140101 A1* | 6/2006 | Tsukagoshi et al. | 369/103 |
| 2006/0171275 A1 | 8/2006 | Nishikawa | 369/53.2 |
| 2007/0092235 A1* | 4/2007 | Misawa | 396/55 |
| 2007/0120042 A1 | 5/2007 | Nishikawa | 250/201.5 |

(Continued)

FOREIGN PATENT DOCUMENTS

JP    2004-022083    1/2004

(Continued)

OTHER PUBLICATIONS

Horigome, H., et al. "Holographic Medium Will Achieve 200G Bytes in 2006," Nikkei Electronics, Jan. 17, 2005, pp. 105-114, with partial translation.

(Continued)

*Primary Examiner*—Andrea Wellington
*Assistant Examiner*—Michael V. Battaglia
(74) *Attorney, Agent, or Firm*—Fitzpatrick, Cella, Harper & Scinto

(57) ABSTRACT

The recording medium 12 is radiated with light beam from the second light source to obtain servo signal from the reflected light. At least one of the relay lenses 8 in the relay optical system is moved perpendicularly to the optical axis according to the servo signal to follow-up moving direction of the recording medium. The light beam from the second laser light source merges with an optical system from the first laser light source to the recording medium 12 between at least one of the relay lenses 8 and the spatial light modulator 3.

5 Claims, 5 Drawing Sheets

U.S. PATENT DOCUMENTS

2007/0183279 A1    8/2007   Nishikawa ............... 369/44.37

FOREIGN PATENT DOCUMENTS

JP         2005-032306         2/2005

OTHER PUBLICATIONS

Tan, Xiaodia, et al. "Holographic Memory/Measurement & Nano Control Technologies for Bolstering HVD™," Proceedings of the 35th Meeting on Lightwave Sensing Technology, Jun. 2005, pp. 75-82, with abstract.

Horimai, H., et al. "Advanced Collinear Holography," Optical Review, vol. 12, No. 2 (2005), pp. 90-92.

* cited by examiner

OPTICAL INFORMATION RECORDING-REPRODUCTION APPARATUS

BACKGROUND OF THE INVENTION

1. Field of the Invention

The present invention relates to an optical information recording-reproduction apparatus, and in particular, to an optical information recording-reproduction apparatus which records information on a recording medium on which information is recorded using holography and reproduces information from the recording medium on which information is recorded.

2. Description of the Related Art

When holography is used to record information, light with image information and reference light are superposed inside a recording medium and interference fringes produced thereby are recorded on the recording medium. When the recorded information is reproduced, the recording medium is radiated with the reference light to reproduce image information by diffraction attributable to the interference fringes. A holographic memory has drawn attention as a super high-density data storage in a practical application area in recent years.

Attention is attracted particularly by an optical disc memory in which image information is developed into two dimensional digital pattern information, then the information is recorded on disc-like recording medium such as CD and DVD using holography and reproduced from the recording medium.

The following literature introduces a recording-reproduction apparatus using a collinear holographic memory as such a technique: "Holographic Memory/Measurement & Nano Control Technologies for Brlostering HVD™", Proceedings of 35th Meeting on Lightwave Sensing Technology, June 2005, p. 75-82, and "Holographic medium soon taking off to realize 200G bytes in 2006," NIKKEI ELECTRONICS, Jan. 17, 2005, pp. 105 to 114.

The system is characterized in that information light and reference light are produced by the same spatial light modulator, transmitted along the same optical axis and converged on the recording medium with an objective lens to record hologram thereon. The system is also characterized in that producing only the reference light by the spatial light modulator and converging it on the recording medium enable information light to be reproduced by diffraction from the recorded hologram.

In such an optical disc memory, focus servo and tracking servo to radial runout of the tracks are normally conducted as is the case with CD and DVD.

Furthermore, the above optical disc memory requires a very high output light source such as a Q-switched laser to record information on a rotating recording medium in a short time. When a light source whose output is on the order of that of a typical semiconductor laser is used, a position radiated with light requires to be changed according to rotation to secure energy supplied for recording.

As a device in which a position radiated with light follows up rotation as described above, for example, Japanese Patent Application Laid-Open No. 2005-032306 discloses a device in which a collimator for a recording light source is moved perpendicularly to the optical axis to cause a position radiated with light to follow-up rotation.

FIG. 7 shows a conventional optical information recording-reproduction apparatus disclosed in Japanese Patent Application Laid-Open No. 2005-032306.

Light from a recording and reproducing light source 1 passes through a first collimator lens 2, a polarization beam splitter 4, a spatial light modulator (information representing means) 35, a pair of relay lenses 6 and 8, a dichroic mirror 10, a ¼ wavelength plate 38, an objective lens 11 and reaches a recording medium 12. On the other hand, light from a servo reading device 13 advances into a second collimator lens 42 and the dichroic mirror 10. A photo detector 5 receives the reproduced light to reproduce the recorded information.

The servo reading device 13 detects positional information of the recording medium 12 and causes driving means 44 to move the first collimator lens 2 while following-up the movement of the recording medium 12. This is to record information at and reproduce information from a normal position while following-up the movement of the recording medium 12 by changing the angle of recording light incident on the polarization beam splitter 4 to shift the position of light incident on the recording medium 12.

Japanese Patent Application Laid-Open No. 2004-022083 discloses a device in which two galvano mirrors disposed in an optical system are used to perform tracking servo and rotation follow-up of a position radiated with light orthogonal thereto.

The above conventional examples, however, involve the following problems.

In general, a moving speed in a rotating direction at a position radiated with light changes according to radial runout even at a constant-speed rotation while a recording medium with eccentricity is rotated.

On the other hand, in conventional examples in which the above recording light source collimator is moved perpendicularly to the optical axis to cause the position radiated with light to perform rotation follow-up, light emitted from a servo reading device merges into a place nearer to the recording medium than the recording light source collimator.

For this reason, in the above conventional examples, the movement of the recording light source collimator does not exert any effect on light emitted from the servo reading device, which does not enable detecting change in moving speed according to radial runout, causing a problem in that accuracy in rotation follow-up is degraded.

In the above conventional examples in which two galvano mirrors disposed in an optical system are used to perform tracking servo and rotation follow-up of a position radiated with light orthogonal thereto, a mirror existing near the recording medium requires rotating. This causes a problem in that an apparatus is increased in size in the vicinity of the recording medium because positional interference needs to avoid against driving means for focus servo.

Alternatively, another mirror device requires providing in the optical system, which causes a problem with the restriction of optical design.

SUMMARY OF THE INVENTION

In view of the above problems, the present invention has for its purpose to secure the performance to follow-up the movement of a recording medium and the compatibility between compactness of the optical system and the above performance.

According to an aspect of the present invention, there is provided an optical information recording-reproduction apparatus comprising a first laser light source; a spatial light modulator for generating reference light and information light from light beam emitted from the first laser light source; a relay lens for leading the reference light and the information light to a recording medium for recording information using holography; a first light receiving device which receives reflected light obtained by radiating the recording medium only with the reference light and reproduces the information; a second laser light source; a second light receiving device which receives reflected light obtained by radiating the recording medium with light beam from the second light source and provides servo signal; and driving means which moves at least one of the relay lenses perpendicularly to an optical axis according to the servo signal; wherein the light beam from the second laser light source merges with an optical system from the first laser light source to the recording medium between the relay lens moving perpendicularly to the optical axis and the spatial light modulator.

The laser light source is preferably a semiconductor laser.

The driving means preferably comprises a two-axis actuator which moves at least one of the relay lenses to two directions perpendicular to the optical axis and orthogonal to each other according to the servo signal.

The relay lens is preferably composed of two lenses, one of the relay lenses is moved perpendicularly to the optical axis according to the servo signal to follow-up the rotational movement direction of the recording medium, and the other of the relay lenses is moved perpendicularly to the optical axis and orthogonally to the direction to which the former relay lenses moves to follow-up radial runout.

In the optical information recording-reproduction apparatus, at least one of the relay lenses arranged between the merging position and the recording medium is preferably a collimator lens.

In the present invention, a relay lens is moved to follow-up the direction to which the recording medium moves and light beam from the light source for obtaining a servo signal is caused to merge between the moving lens and the spatial light modulator, which eliminates the need for adding an device to the apparatus and allows following-up error to be accurately detected according to the movement of the relay lens. This enables securing the performance to follow-up the movement of a recording medium and the compatibility between compactness of the optical system and the above performance.

Further features of the present invention will become apparent from the following description of exemplary embodiments with reference to the attached drawings.

DESCRIPTION OF THE EMBODIMENTS

First Embodiment

Figure 1:
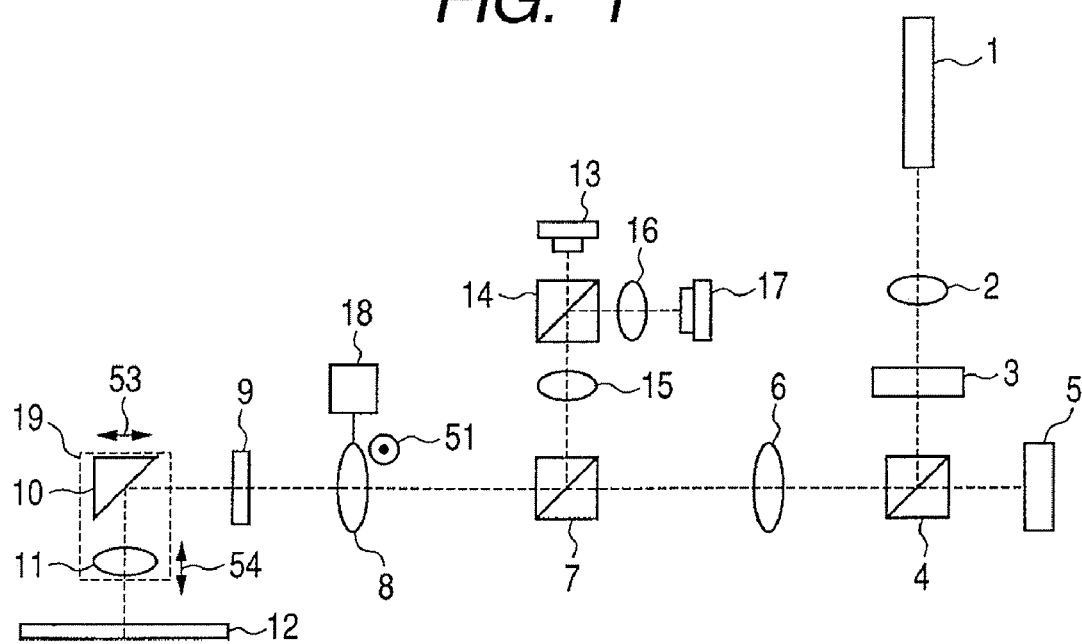
FIG. 1 shows an optical path in an optical information recording-reproduction apparatus related to a first embodiment.

FIG. 1 shows the optical path in the optical information recording-reproduction apparatus related to the first embodiment in the present invention.

First, the optical path in recording is described.

Light beam emitted from a green laser diode (LD) of the recording and reproducing light source as a first laser light source is converted into a parallel light beam by a collimator 2 and falls on a spatial light modulator 3.

The spatial light modulator 3 is formed of liquid crystal device, takes advantage of the optical rotatory power thereof to determine whether or not to rotate the polarized direction of the pixels by 90°. Thereafter, prescribed information can be loaded onto the incident light beam depending on whether or not the incident light beam is reflected from a polarization beam splitter 4. That is to say, information patterns to be recorded are formed around the center of the light beam and reference light patterns are formed around the periphery thereof, which allows information light and reference light to be produced at the same time.

Thus produced recording light beam composed of the information light and reference light passes through the beam polarization beam splitter 4 and a pair of relay lenses 6 and 8 between which a dichroic beam splitter 7 is interposed and reaches a ¼ wavelength plate 9. The ¼ wavelength plate 9 converts linearly polarized light into circularly polarized light. Recording light beam consisting of circularly polarized light is polarized with a mirror 10, passes through an objective lens 11 and strikes on a hologram disc 12 which is a recording medium.

The hologram disc 12 consists of a transparent substrate, a recording layer which absorbs green wavelength light and transmits red wavelength light and a reflective layer, when viewed from the light incident side, and is driven by a disc driving means (not shown). The information light and the reference light interfere with each other in the hologram disc and the hologram thereof is recorded.

In the next place, the optical path in reproducing is described below.

The optical beam path in reproducing is fundamentally the same as that in recording. However, only a predetermined reference light pattern is produced in the spatial light modulator 3. At this point, an information pattern area 21 may be masked. When the reference light strikes on the hologram disc 12, it is diffracted by the recorded hologram to generate reproduction light loaded with the stored information.

The reproduction light is converted into a substantially parallel light beam by the objective lens 11 and converted into a linearly polarized light orthogonal to the light in striking on the hologram disc 12 by the ¼ wavelength plate 9. Subsequently, the reproduction light follows back the same optical path as that in radiating, then passes through the polarization beam splitter 4 and is received by a CMOS sensor 5 which is an image first light receiving device to be reproduced to image. The CMOS sensor 5 shields light peripheral to the reproduction light which does not contribute to diffraction.

On the other hand, to read a signal for servo and a signal for addressing, light beam is emitted from a red LD 13 which is a second laser light source for reading the servo signal and the addressing signal. The light beam passes through a polarization beam splitter 14 and a coupling lens 15, reflected from the dichroic beam splitter 7 and passes through the relay lens 8. After passing through the relay lens 8, the light beam is turned into a substantially parallel one. After passing through the ¼ wavelength plate 9, the light beam is deflected by the mirror 10 and caused to strike on the hologram disc 12 by the objective lens 11.

The light beam for reading the servo signal and the addressing signal reflected by the reflecting layer of the hologram disc 12 carries information for both the servo and the addressing signal, follows back the same optical path and is reflected from the polarization beam splitter 14. The reflected light beam passes through a sensor lens 16 and is incident on a photo diode (PD) 17 which is a second light receiving device and also serves as a light receiving device for the servo and the addressing signal, after which the servo signal and the addressing signal are reproduced therein. A rotational-direction follow-up error signal is also obtained therein.

Incidentally, at least one of the relay lenses moves perpendicularly to the optical axis by driving means (hereinafter, the relay lens is referred to as "movable relay lens"). In the present embodiment, the relay lens 8 is adapted to reciprocate leftward and rightward with respect to the optical axis by an one-axis actuator 18 using a magnetic circuit which is a driving means (hereinafter, for all embodiments, in FIGS. 1, 3 and 4 as if an optical axis existed in the paper, the direction perpendicular to the paper as shown by an arrow chip 51 affixed to the relay lenses 6 and 8 is taken to be a "leftward and rightward" direction, and the direction shown by an arrow 52 on the paper is taken to be an "upward and downward" direction.). The actuator 18 is feedback-controlled according to the servo signal reproduced from the light beam incident on PD 17 to move the relay lens 8.

In the present embodiment, to realize the above control, the optical system for reading the servo and the addressing signal consisting of PD 17 and others is merged with the recording and reproducing optical system upstream above the movable relay lens 8 in the optical path in recording, that is, downstream in the optical path in reproducing, thereby allowing the signal to be detected according to the movement of the movable relay lens 8.

Incidentally, the focus servo and the tracking servo use feedback control according to the servo signal reproduced from the light beam incident on PD 17 as is the case with the conventional CD and DVD. The tracking servo is performed by moving a carriage optical system 19 consisting of the mirror 10 and the objective lens 11 to the direction shown by an arrow 53 in the figure. The focus servo is performed by moving the objective lens 11 in the carriage optical system 19 to the direction shown by an arrow 54 in the figure.

Figure 2:
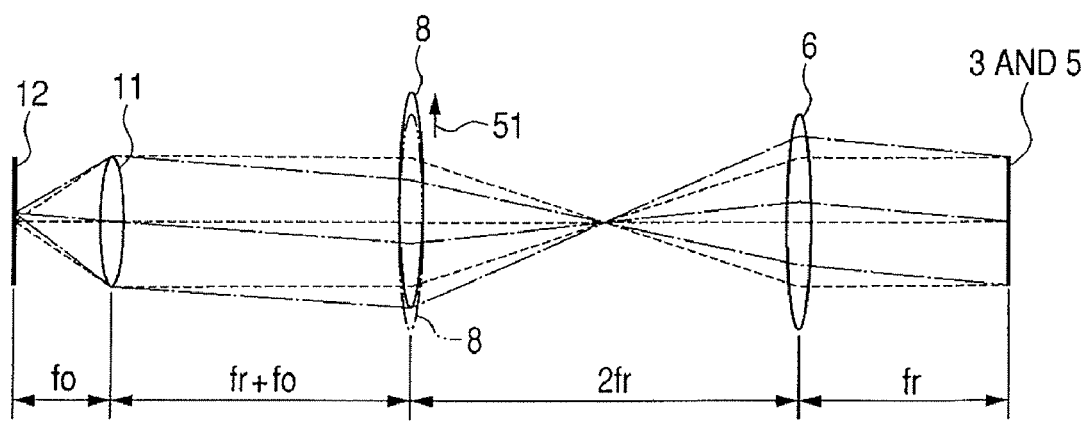
FIG. 2 shows an schematic diagram of an optical system for cases where the one relay lens is moved according to the present invention.

FIG. 2 schematically shows the optical system of the present embodiment. Since both the spatial light modulator 3 and the CMOS sensor 5 which is an image light receiving device are disposed at a position away by the focal distance fr from the relay lens 6 as shown in FIG. 1, the position where both components are situated in the schematic diagram of FIG. 2 is represented by the same position shown by "3 AND 5." The hologram disc 12 rotates upward and downward in the paper in FIG. 2.

The focal distance of the objective lens 11 is expressed by fo. A distance between the relay lens 6 and the spatial light modulator 3 and between the relay lens 6 and each of the CMOS sensors 5 is "fr", which is not apparently shown in FIG. 1 though. A distance between the relay lenses 6 and 8 is two times of fr. A distance between the relay lens 8 and the objective lens 11 is the sum of fr and fo.

The center of the relay lens 6 coincides with that of the optical axis in FIG. 2. The optical path shown in a broken line is an optical path for cases where the relay lens 8 is placed at a position shown in a chain double-dashed line 8' where the center thereof coincides with the center of the optical axis, in other words, at this point, the relay lenses 6 and 8 are along the same optical axis. The optical path shown in an alternate long and short dash line is an optical path for cases where the relay lens 8 is shifted to the direction shown by the arrow 51 by the position shown in a solid line with the actuator 18 according to a rotational direction follow-up error signal.

In FIG. 2, when the relay lens 8 is moved toward the arrow 51 from the position shown in the chain double-dashed line 8' to the position shown in the solid line 8, light beams after movement shown in the alternate long and short dash lines tilt with respect to the light beams before movement shown in the broken lines, which causes the light beams incident on the objective lens 11 to tilt. That is to say, the information light and the reference light formed by the spatial light modulator 3 strike on a normal position of the hologram disc 12 to be recorded while following up the rotation of the hologram disc 12.

Also in reproducing, the optical path shown in the alternate long and short dash line is followed in FIG. 2, so that it is possible to perform reproduction from the normal position on the hologram disc 12.

As described above, according to the present embodiment, it is possible to follow-up the movement of the recording medium without any addition of devices such as mirror and the like. In addition, signals can be detected according to the movement of the movable device, which enables securing follow-up performance for the movement of the recording medium.

Second Embodiment

Figure 3:
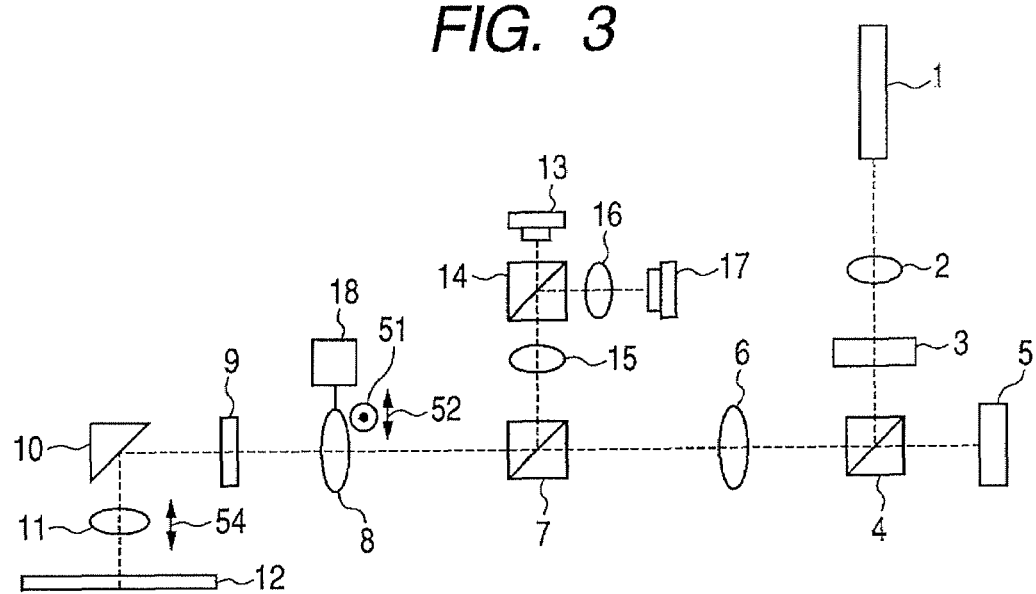
FIG. 3 shows an optical path in an optical information recording-reproduction apparatus related to a second embodiment.

FIG. 3 shows an optical path in an optical information recording-reproduction apparatus related to a second embodiment of the present invention.

The optical paths of the recording and reproducing optical system and the servo and addressing signal reading optical system are the same as those in the first embodiment.

For this reason, only a difference from the first embodiment is described.

In the present embodiment, the relay lens 8 is reciprocated with respect to the optical axis upward and downward as well as leftward and rightward by a two-axis actuator 18 using a magnetic circuit. The actuator 18 is subjected to a feedback control according to the tracking error signal reproduced from the light beam incident on PD 17 and the servo signal which is the rotational direction follow-up error signal to move the relay lens 8.

In the first embodiment, the periphery of the recording medium is slightly increased in size because of space needed for moving means (not shown) for the carriage optical system 19, whereas in the present embodiment, tracking is also performed by the relay lens 8 to make the device simple and compact around the recording medium.

Incidentally, the optical path for cases where the relay lens 8 is moved is shown in the alternate long and short dash line in the schematic diagram in FIG. 2 when viewed from each cross section of the radial and the rotational direction of the hologram disc.

As described above, according to the present embodiment, it is possible to follow-up the movement of the recording medium without any addition of devices such as mirror and the like. In addition, signals can be detected according to the movement of the movable device, which enables securing follow-up performance for the movement of the recording medium.

Furthermore, the device around the medium can be reduced in size.

Third Embodiment

Figure 4:
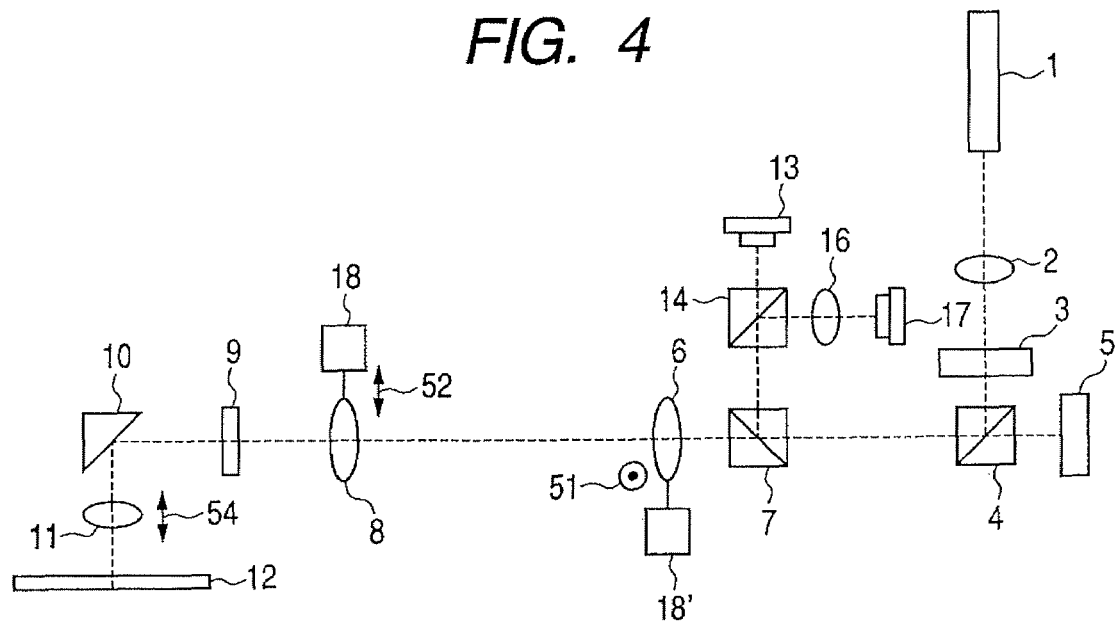
FIG. 4 shows an optical path in an optical information recording-reproduction apparatus related to a third embodiment.

FIG. 4 shows an optical path in an optical information recording-reproduction apparatus related to a third embodiment of the present invention.

The optical paths of the recording and reproducing optical system and the servo and addressing signal reading optical system are similar to those in the first and the second embodiment.

In the present embodiment, a position where the servo and addressing signal reading optical system is merged with the recording and reproducing optical system is different from the above embodiments. In other words, the dichroic beam splitter 7 is arranged between the relay lens 6 and the polarization beam splitter 4 for the recording and reproducing optical system.

In addition, the coupling lens 15 for the servo and addressing signal reading optical system is removed, instead the relay lens 6 is used as a collimate lens for light beams from the red LD 13. Thus, specifications of the sensor lens 16 are revised.

The relay lens 6 as well as the relay lens 8 is movable. That is to say, the relay lens 6 is adapted to reciprocate leftward and rightward with respect to the optical axis by the actuator 18'. The relay lens 8 is adapted to reciprocate upward and downward with respect to the optical axis by the actuator 18. The actuators 18 and 18' are one-shaft actuators using a magnetic circuit respectively. The actuators 18 is subjected to a feedback control according to the rotational direction follow-up error signal reproduced from light beams incident on PD 17. The actuators 18' is subjected to a feedback control according to the tracking error signal reproduced from light beams incident on PD 17.

Figure 5:
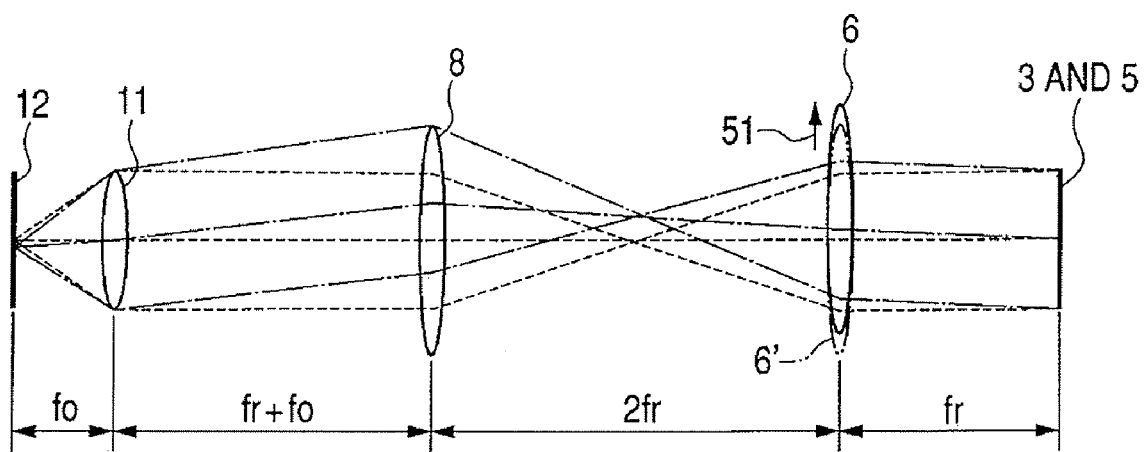
FIG. 5 shows an schematic diagram of an optical system for cases where the other relay lens is moved according to the present invention.

FIG. 5 schematically shows the optical system related to the present embodiment for cases where the relay lens 6 of the CMS sensor 5 which is an image light receiving device is moved. The definitions of the reference characters, distance and layout in the figure are the same as those in FIG. 2.

In FIG. 5, the center of the relay lens 8 coincides with that of the optical axis. The optical path shown in a broken line is an optical path for cases where the relay lens 6 is placed at a position shown in a chain double-dashed line 6' where the center thereof coincides with the center of the optical axis, in other words, at this point, the relay lenses 6 and 8 are along the same optical axis. The optical path shown in an alternate long and short dash line is an optical path for cases where the relay lens 6 is shifted to the direction shown by the arrow 51 by the position shown in a solid line with the actuator 18' according to a rotational direction follow-up error signal.

In FIG. 5, when the relay lens 6 is moved toward the arrow 51 from the position shown in the chain double-dashed line 6' to the position shown in the solid line 6, light beams after movement shown in the alternate long and short dash line tilt with respect to the light beams before movement shown in the broken line, which causes light beams incident on the objective lens 11 to tilt. That is to say, the information light and the reference light formed by the spatial light modulator 3 strike on a normal position of the hologram disc 12 to be recorded while following up the rotation of the hologram disc 12.

Also in reproducing, the optical path shown in the alternate long and short dash line in FIG. 5 is followed, so that it is possible to perform reproduction from the normal position on the hologram disc 12.

The second embodiment requires an actuator capable of moving to two directions and is highly technical. In the present embodiment, on the other hand, tracking and rotational direction following-up are performed by the relay lenses 6 and 8 separately, which requires an actuator which moves only to one direction, this facilitates realization.

As described above, according to the present embodiment, it is possible to follow-up the movement of the recording medium without any addition of devices such as mirror and the like. In addition, signals can be detected according to the movement of the movable device, which enables securing follow-up performance for the movement of the recording medium. Furthermore, the device around the medium is probably reduced in size.

Fourth Embodiment

Next, the fourth embodiment is described in the following.

Figure 6:
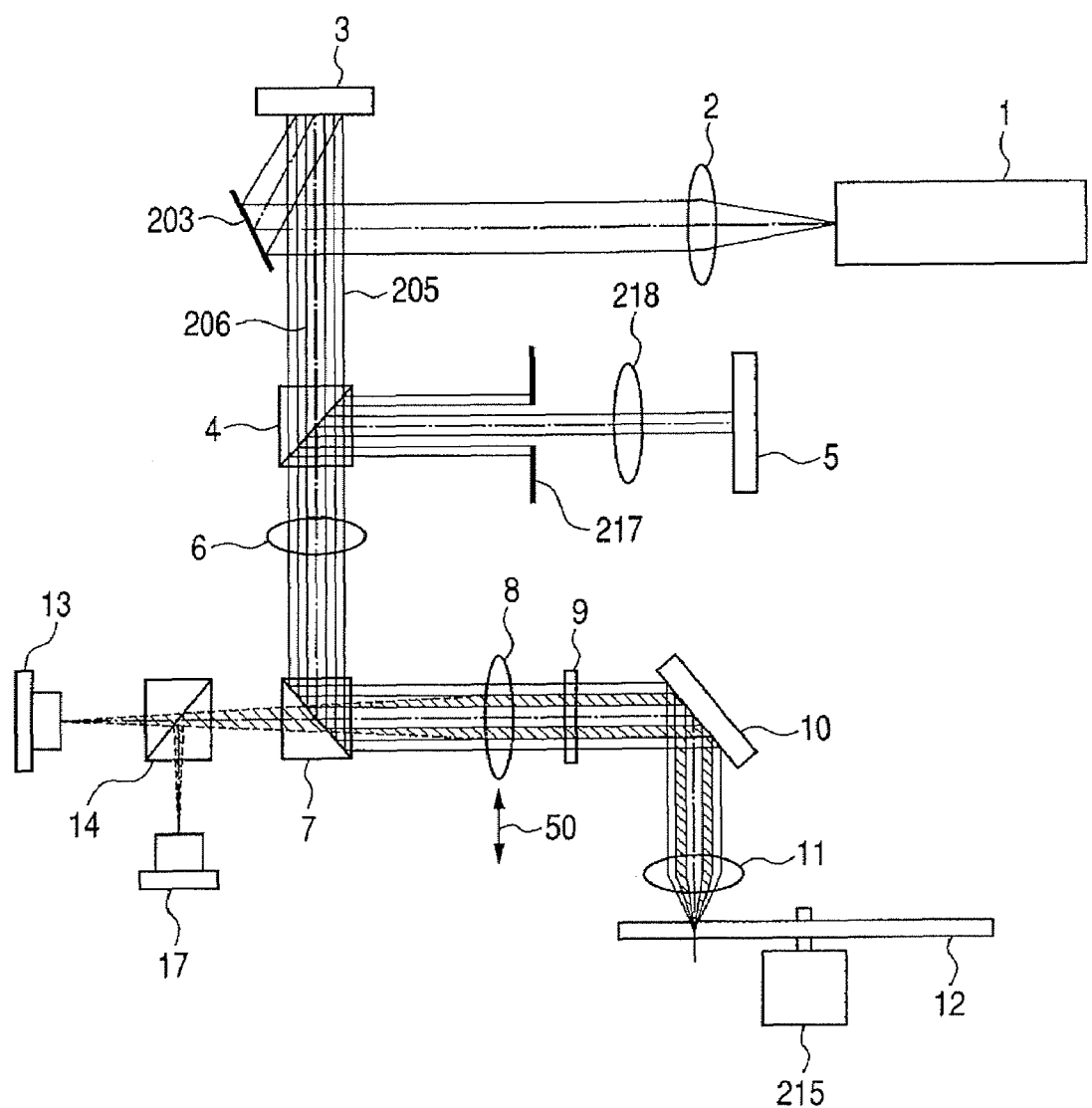
FIG. 6 shows an optical system of a holography optical pickup device which is an optical information recording-reproduction apparatus related to a fourth embodiment.
Figure 7:
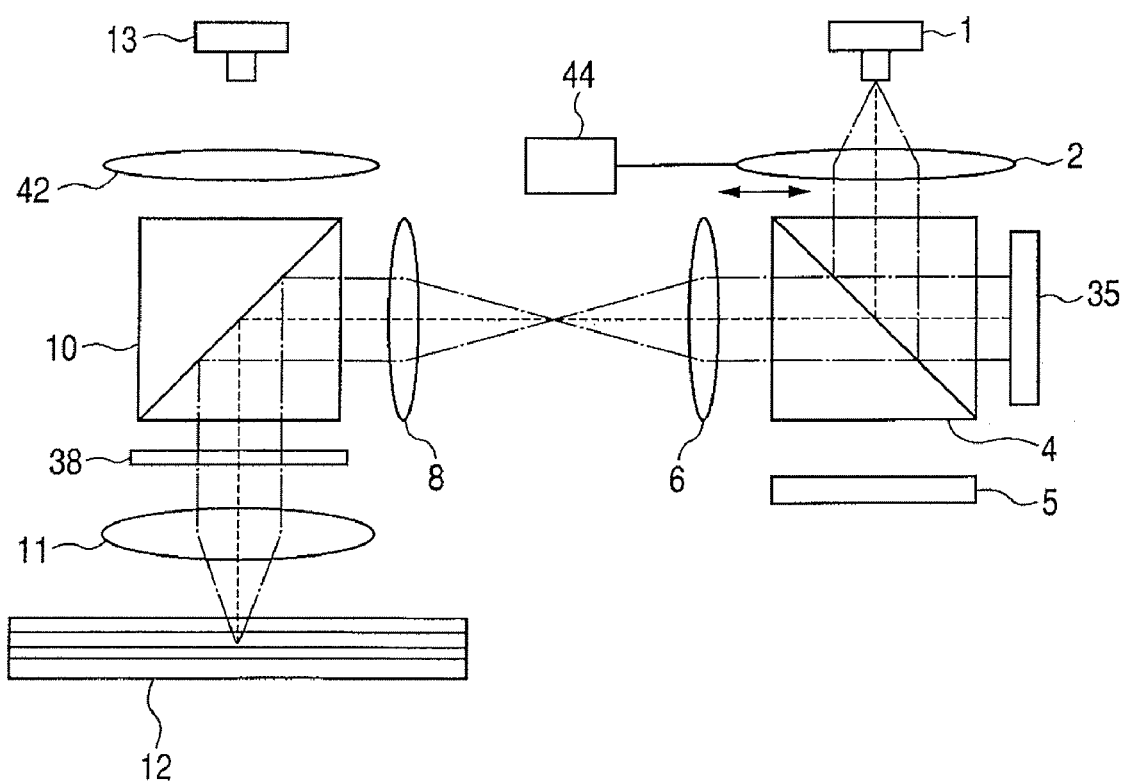
FIG. 7 shows a conventional optical information recording-reproduction apparatus.

FIG. 6 shows one example of an optical system for a holography optical pickup device which is an optical information recording-reproduction apparatus according to the present invention.

In the optical information recording-reproduction apparatus of the present embodiment as shown in FIG. 6, the dichroic BS 7 for green laser is arranged between a first relay lens 6 and a second relay lens 8. An information recording and reproducing optical control system consists of the red laser 13, BS 14, and photo detector 17. The information recording and reproducing optical control system is so configured that servo light emitted from the red laser 13 passes through the second relay lens 8 and is merged with the information recording and reproducing light (reference light 205 and information light 206) reflected from the green laser dichroic BS 7 along the same optical axis.

In the present embodiment, an optical system through which the information recording and reproducing light emitted from the green laser 1 being the first laser light source passes is constituted by the collimator 2, a mirror 203, a SLM (DMD) 3, a PBS 4, and the first relay lens 6. Light (reference light 205 and information light 206) passing through the first relay lens 6 is reflected from the green laser dichroic BS 7, merged with the information recording and reproducing control light (servo light) along the same axis, falls on the second relay lens 8 and converted into circularly polarized light by the QWP 9. An optical system subsequent to QWP 9 is composed of the mirror 10 and the objective lens 11 as shown in FIG. 6.

On the other hand, the servo light emitted from the red laser 13 which is the second laser light source passes through BS 211 and the green laser dichroic BS 7 and is collimated by the second relay lens 8. The collimated light follows the path subsequent to QWP 9.

As stated above, in the present embodiment, the second relay lens 8 on the side of the recording medium is used also as a collimator lens for the servo light emitted from the red laser 13.

Furthermore, in the present embodiment, the servo light and the information recording and reproducing light (reference light 205 and information light 206) are propagated along the same axis from the hologram disc 12 to the green laser dichroic BS 7. For this reason, in the present embodiment, the position of the second relay lens 8 on the side of the recording medium is moved perpendicularly to the optical axis (refer to the arrow 50 in the figure) according to the control signal related to tracking control from a controller (not shown) by an actuator (not shown). This permits the beams to be moved in the in-plane direction of the rotating hologram disc 12, for example, in the radial direction, thereby realizing a tracking serve control in which a holographic radiation position is caused to follow-up a desired writing position of the hologram disc 12.

In the present embodiment, by controlling in the above manner optical paths do not change both in the back and the forth path nearer the light source than the second relay lens 8, and image does not fluctuate on CMOS sensor 5, allowing a stable record and reproduction to be realized. The object lens 11 is dedicated only to a focus servo operation to reduce the movable area around the objective lens 11, which leads to downsize the apparatus.

According to the present embodiment, therefore, one of the pair of the relay lenses of the optical system for information record and reproduction is used as the collimator lens of the optical system for servo light. This decreases the number of optical servo components to downsize the apparatus and reduce the cost thereof, thereby enabling providing a downsized and low-cost optical information recording-reproduction apparatus. Furthermore, the tracking control performed by the second relay lens 8 on the side of the recording medium enables providing stable image on CMOS sensor 5.

Incidentally, DMD is used as a spatial light modulator (SLM) in the above embodiment, however, in addition to that, other reflective-type modulator, for example, Liquid Crystal on Silicon (LCOS) that is, a reflective type liquid crystal, or a transmission-type modulator may be used in the present invention. The use of the transmission-type modulator does not require the mirror 203.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-343881, filed Nov. 29, 2005, and 2005-343886, filed Nov. 29, 2005, which are hereby incorporated by reference herein in their entirety.

What is claimed is:

1. An optical information recording-reproduction apparatus comprising:
    a first laser light source;
    a spatial light modulator for generating reference light and information light from light beam emitted from the first laser light source;
    a relay lens for leading the reference light and the information light to a recording medium for recording information using holography;
    a first light receiving device which receives reflected light obtained by radiating the recording medium only with the reference light and reproduces the information;
    a second laser light source;
    a second light receiving device which receives reflected light obtained by radiating the recording medium with light beam from the second light source and provides servo signal; and
    driving means which moves at least one of the relay lenses perpendicularly to an optical axis according to the servo signal; wherein the light beam from the second laser light source merges with an optical system from the first laser light source to the recording medium between the relay lens moving perpendicularly to the optical axis and the spatial light modulator.

2. The optical information recording-reproduction apparatus according to claim 1, wherein the laser light source is a semiconductor laser.

3. The optical information recording-reproduction apparatus according to claim 1, wherein the driving means comprises a two-axis actuator which moves at least one of the relay lenses to two directions perpendicular to the optical axis and orthogonal to each other according to the servo signal.

4. The optical information recording-reproduction apparatus according to claim 1, wherein the relay lens is composed of two lenses, one of the relay lenses is moved perpendicularly to the optical axis according to the servo signal to follow-up the rotational movement direction of the recording medium, and the other of the relay lenses is moved perpendicularly to the optical axis and orthogonally to the direction to which the former relay lenses moves to follow-up radial runout of the tracks.

5. The optical information recording-reproduction apparatus according to claim 1, wherein at least one of the relay lenses arranged between the merging position and the recording medium is a collimator lens.

* * * * *